(12) United States Patent
Chen

(10) Patent No.: US 6,439,800 B1
(45) Date of Patent: Aug. 27, 2002

(54) BRAKE CABLE HANGER PLATE FOR CONNECTING BRAKE CABLES AND YOKE CABLE FOR A BICYCLE

(76) Inventor: Tse-Min Chen, No. 14, Lane 69, Tian Jin Road Section 4, Pei Tun Dist., Taichung (TW)

( * ) Notice: Subject to any disclaimer, the term of this patent is extended or adjusted under 35 U.S.C. 154(b) by 38 days.

(21) Appl. No.: 09/612,568

(22) Filed: Jul. 7, 2000

(51) Int. Cl.7 ................................................. B25G 3/36
(52) U.S. Cl. .................... 403/396; 403/408.1; 403/384; 280/264
(58) Field of Search .......................... 280/264; 403/384, 403/389, 396, 408.1

(56) References Cited

U.S. PATENT DOCUMENTS

| | | | | |
|---|---|---|---|---|
| 2,160,181 A | * | 5/1939 | Taylor | |
| 3,186,519 A | * | 6/1965 | Johannesen | |
| 4,623,050 A | * | 11/1986 | Copp | |
| 4,877,112 A | * | 10/1989 | Malinowski | |
| 4,896,750 A | * | 1/1990 | Tseng | |
| 4,949,591 A | * | 8/1990 | Roelle | |
| 5,215,167 A | * | 6/1993 | Davidson | |
| 5,431,256 A | * | 7/1995 | Wen | |
| 5,501,302 A | * | 3/1996 | Hung | |
| 6,171,141 B1 | * | 1/2001 | Yasui et al. | |
| 6,189,847 B1 | * | 2/2001 | Hart | |

* cited by examiner

*Primary Examiner*—Lynne H. Browne
*Assistant Examiner*—Tomlyne A Malcolm

(57) ABSTRACT

A brake cable hanger assembly for connecting brake cables and a yoke cable of a bicycle brake mechanism includes a plate having a hole defined therethrough and a bent side extends from a lower end of said plate. Three protrusions split from said plate and define three apertures. A flange extends from a top end of said plate and two notches are defined in said flange. A positioning plate is engaged between said flange and said protrusions. A central hole is defined through said positioning plate. A bolt extends through said hole in said plate and said central hole in said positioning plate, and a nut is engaged with said bolt. Two brake cables extend through notches in the flange and are securely clamped between the positioning plate and the plate.

2 Claims, 3 Drawing Sheets

BRAKE CABLE HANGER PLATE FOR CONNECTING BRAKE CABLES AND YOKE CABLE FOR A BICYCLE

FIELD OF THE INVENTION

The present invention relates to a brake cable hanger assembly that easily connects two brake cables and a yoke cable which is connected between two brake calipers.

BACKGROUND OF THE INVENTION

A conventional hanger plate 1 is shown in FIG. 1 and generally is a triangle plate that has a rectangular hole 112 defined through a peak portion and a base of the plate is bent to define a groove 111 such that a yoke cable (not shown) connected between two brake calipers (not shown) is engaged with the groove 111 and suspended by the hanger plate 1. A lock bolt 12 has a cubic protrusion 121 extending from a head of the bolt 12 and a threaded rod 122 extends from the cubic protrusion 121. A passage 123 is defined through the cubic protrusion 121 so as to allow a brake cable "S" passing through the passage 123. As shown in FIG. 2, the threaded rod 122 extends through the rectangular hole 112 and engaged with a nut 13 and the bolt 12 is rotated to securely position the brake cable "S". When braking, the brake cable "S" is pulled and the hanger plate 11 is lifted and the two brake calipers are therefore pulled by a movement of the yoke cable. However, the bolt 12 involves a complicated shape and this makes the manufacturing cost of the bolt 12 be higher than that of the general bolt. Besides, only one brake cable "S" can be connected to the hanger plate 11.

The present invention intends to provide a brake cable hanger assembly that is connected to two brake cables and a yoke cable, and a bolt that positions the brake cables is a general bolt.

SUMMARY OF THE INVENTION

In accordance with one aspect of the present invention, there is provided a brake cable hanger assembly for connecting brake cables and a yoke cable of a bicycle brake mechanism. A hanger plate of the brake cable hanger assembly has a hole defined therethrough and a bent side extends from a lower end of said plate. Three protrusions split from said plate and define three apertures. A flange extends from a top end of said plate and two notches are defined in said flange. A positioning plate is engaged between said flange and said protrusions. A central hole is defined through said positioning plate. A bolt extends through said hole in said plate and said central hole in said positioning plate, and a nut is engaged with said bolt. Two brake cables extend through notches in the flange and are securely clamped between the positioning plate and the plate.

The object of the present invention is to provide a brake cable hanger assembly that is easily to be manufactured and the brake cables are well clamped and positioned.

Another object of the present invention is to provide a brake cable hanger assembly that has three protrusions and the two brake cables are separated by the protrusions so that the brake cables will not tangled with each other.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 2:
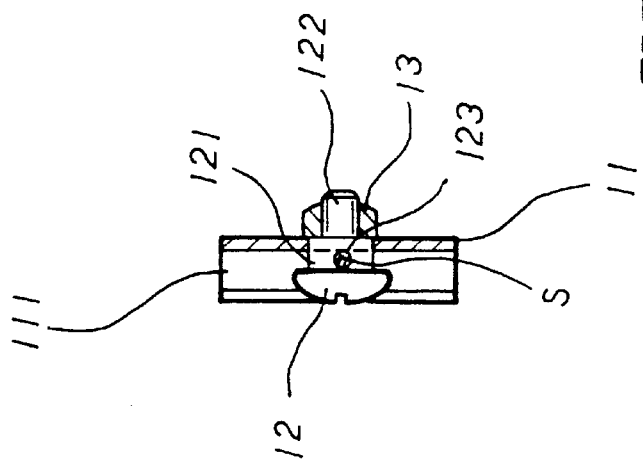
FIG. 2 is a side elevational view, partly in section, of the assembly of the hanger plate, the brake cable and the bolt engaged with the nut as shown in FIG. 1.
Figure 1:
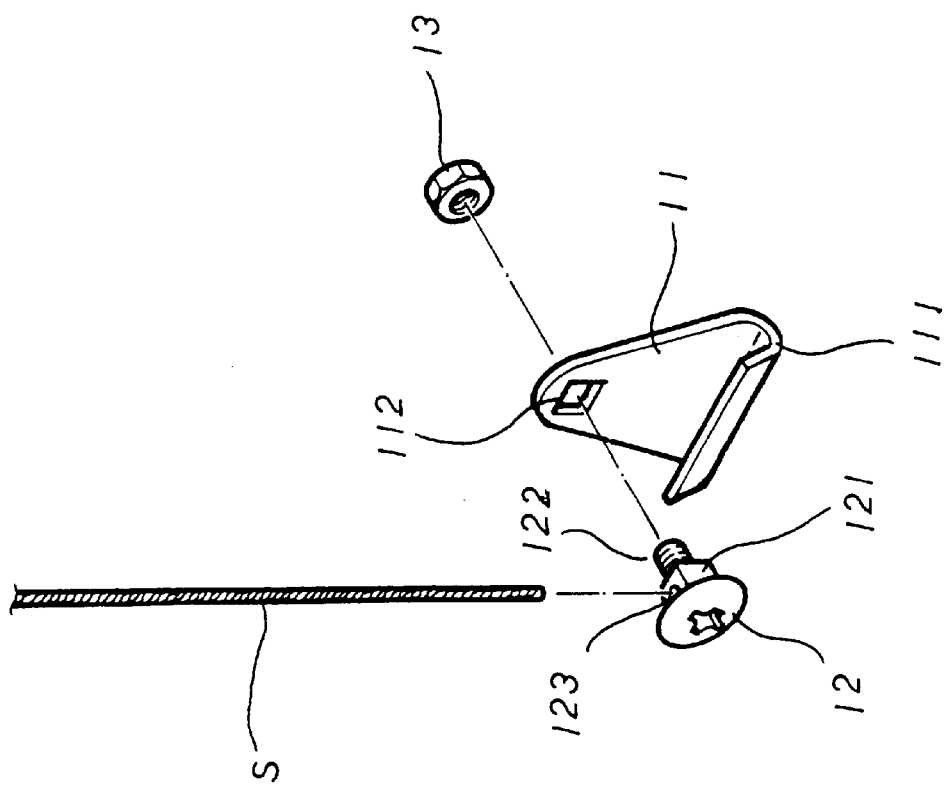
FIG. 1 is an exploded view to show a conventional hanger plate, a brake cable and a bolt with a nut.
Figure 4:
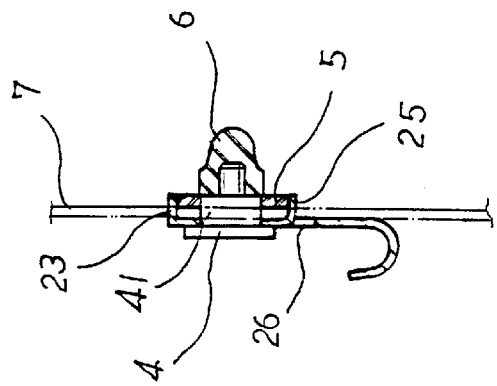
FIG. 4 is a side elevational view, partly in section, of the assembly of the hanger plate, the brake cables, the bolt, the positioning plate and the nut engaged with the bolt as shown in FIG. 3.
Figure 3:
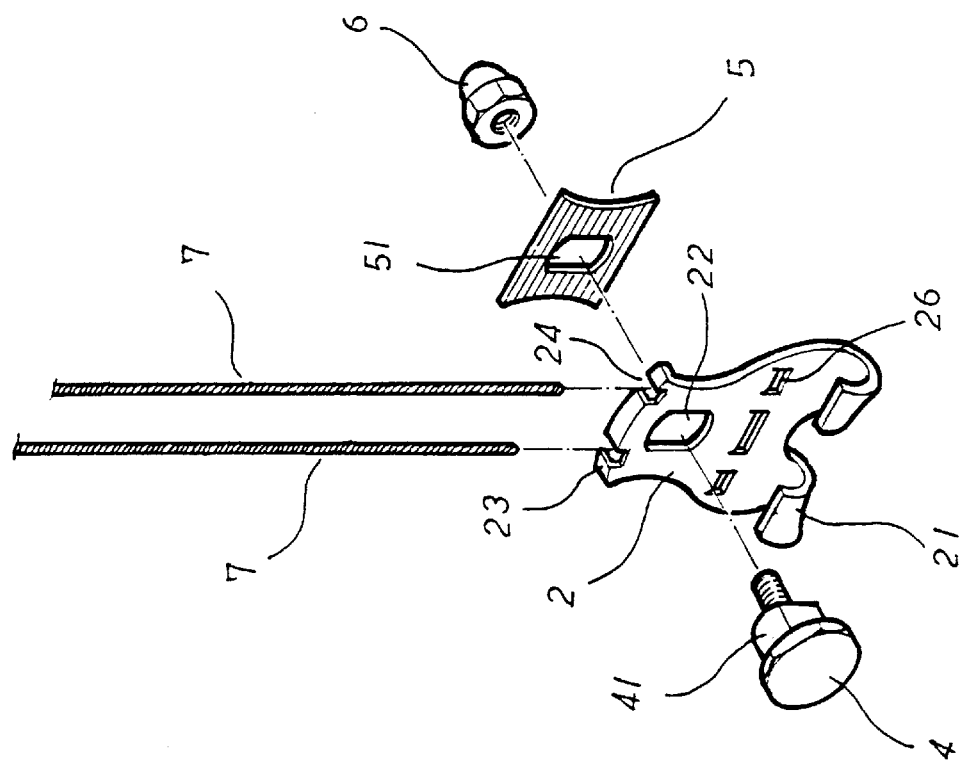
FIG. 3 is an exploded view to show a hanger plate of the present invention, two brake cables, a bolt, a positioning plate and a nut.

Referring to FIGS. 3 and 4, the brake cable hanger assembly in accordance with the present invention includes a plate 2 that has a hole 22 defined therethrough and a bent side extends from a lower end of the plate 2 so as to define a groove 21 between the bent side and the plate 2. A flange 23 extends from a top end of the plate 2 and two notches 24 are defined through the flange 23. Three protrusions 25 split from the plate 2 so as to defined three apertures 26 in the plate 2 and the protrusions are located between the bent side and the hole 22. A positioning plate 5 having a central hole 51 is connected to the plate 2 and two ends of the positioning plate 5 respectively contact the flange 23 and the protrusions 25. Two brake cables 7 are respectively received in the two notches 24 and are clamped between the plate 2 and the positioning plate 5. The two brake cables 7 are separated by the protrusions 25 so that they will not be tangled with each other.

A bolt 4 extends through the hole 22 and the central hole 51 of the positioning plate 5, and is engaged with a nut 6 to securely clamp the two brake cables 7 in position. The lower end of each brake cable 7 extends through a gap between the protrusions 25.

Figure 5:
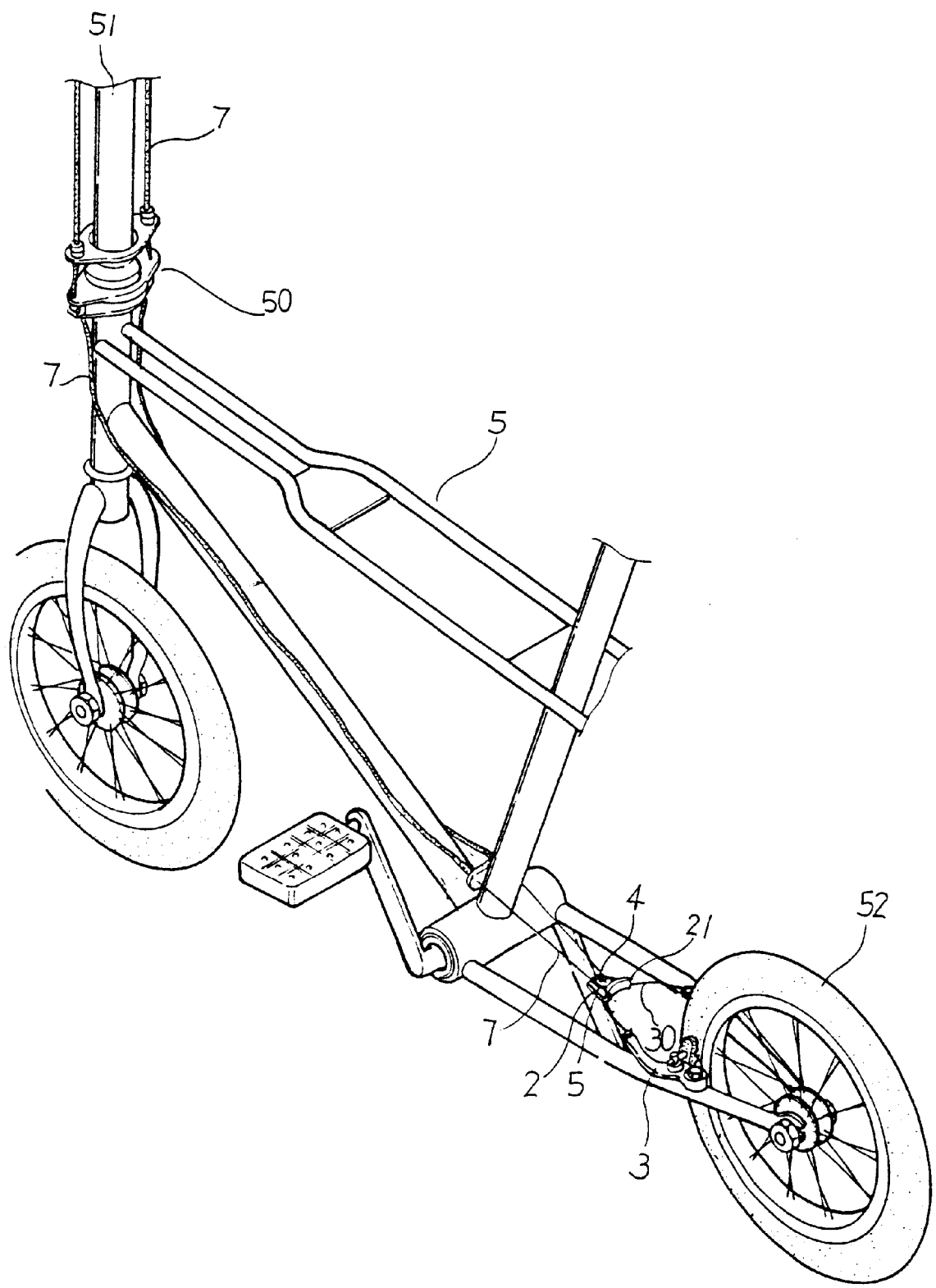
FIG. 5 is a perspective view to show the hanger plate of the present invention used in a bicycle.

As shown in FIG. 5, when the present invention is used in a stunt bicycle 5 that has a rotatable mechanism 50 allows two brake cables 7 not to tangle the handlebar stem 51 when the handlebar stem 51 is rotated. The two brake cables 7 are fixedly connected to the hanger plate 2 and a yoke 30 is engaged with the groove 21 of the hanger plate 2. Two brake calipers 3 are respectively connected to two ends of the yoke cable 30. Accordingly, when the hanger plate 2 is pulled by pulling brake levers (not shown), the two brake calipers 3 are pivoted to brake the rear wheel 52.

In the assembly, the bolt 4 has a polygonal section 41 which is engaged with the hole 22 in the plate 2 and the central hole 51 in the positioning plate 5. By this way, the two brake cables 7 can be firmly connected to the hanger plate 2, that is convenient for riders to employ the assembly in different types of bicycles.

While we have shown and described various embodiments in accordance with the present invention, it should be clear to those skilled in the art that further embodiments may be made without departing from the scope and spirit of the present invention.

What is claimed is:

1. A brake cable hanger assembly for connecting brake cables and a yoke cable of a bicycle brake mechanism, comprising:

plate having a hole defined therethrough, a bent side extending from a lower end of said plate and three protrusions split from said plate and defining three apertures, a flange extending from a top end of said plate and two notches defined in said flange;

a positioning plate engaged between said flange and said protrusions, a central hole defined through said positioning plate, and a bolt extending through said hole in said plate and said central hole in said positioning plate, a nut engaged with said bolt.

2. The brake cable hanger assembly as claimed in claim 1 wherein said bolt has a polygonal section which is engaged with said hole in said plate and said central hole in said positioning plate.

* * * * *